(12) United States Patent
Brenna et al.

(10) Patent No.: US 9,456,712 B2
(45) Date of Patent: Oct. 4, 2016

(54) KITCHEN APPLIANCE

(75) Inventors: Claudio Brenna, Klagenfurt (AT);
Laura Klancnik, Slovenj Gradec (SI);
Juergen Holzbauer, Maria Rain (AT)

(73) Assignee: KONINKLIJKE PHILIPS N.V.,
Eindhoven (NL)

( * ) Notice: Subject to any disclaimer, the term of this patent is extended or adjusted under 35 U.S.C. 154(b) by 918 days.

(21) Appl. No.: 13/380,915

(22) PCT Filed: Jul. 7, 2010

(86) PCT No.: PCT/IB2010/053103
§ 371 (c)(1),
(2), (4) Date: Dec. 27, 2011

(87) PCT Pub. No.: WO2011/004327
PCT Pub. Date: Jan. 13, 2011

(65) Prior Publication Data
US 2012/0097051 A1    Apr. 26, 2012

(30) Foreign Application Priority Data

Jul. 9, 2009  (EP) ...................................... 09165017

(51) Int. Cl.
*A23N 1/02* (2006.01)
*A47J 19/02* (2006.01)

(52) U.S. Cl.
CPC .................................... *A47J 19/027* (2013.01)

(58) Field of Classification Search
CPC ..................................................... A47J 19/027
USPC ............. 99/510, 511, 513; 241/68, 79.3, 83, 241/273.1
See application file for complete search history.

(56) References Cited

U.S. PATENT DOCUMENTS

| 6,050,180 A | 4/2000 | Moline |
| 2007/0089615 A1 | 4/2007 | Wu Chang |
| 2008/0163767 A1 | 7/2008 | Wu Chang |
| 2008/0187638 A1* | 8/2008 | Hansen .......................... 426/433 |
| 2009/0272280 A1* | 11/2009 | Cheung et al. .................. 99/513 |

FOREIGN PATENT DOCUMENTS

| CN | 2754505 Y | 1/2006 |
| CN | 200977056 Y | 11/2007 |
| DE | 1146627 B | 9/1959 |
| DE | 2309408 A1 | 5/1974 |
| EP | 0639449 A1 | 2/1995 |
| GB | 2124893 A | 2/1984 |
| GB | 2401810 A | 11/2004 |
| JP | 59025714 A | 2/1984 |
| JP | 1204620 A | 8/1989 |
| WO | 2005051146 A1 | 6/2005 |
| WO | 2008062345 A1 | 5/2008 |

* cited by examiner

*Primary Examiner* — David Angwin
*Assistant Examiner* — Amit K Singh

(57) ABSTRACT

A kitchen appliance includes a rotatable filter element (30) having a closed bottomed with a grating disc (34). The filter element has an outer perimeter and a conical perforated wall (33) that extends from the outer perimeter to an upper edge defining an open upper part of the filter element. The kitchen appliance includes a drive motor for driving the filter element and a feeding tube (10) having a tubular wall extending from a first open distal end for receiving foodstuff to a second open distal end that opens near the grating disc. A cover member (60) extends from the upper edge of the perforated wall up to the tubular wall of the feeding tube (10). The cover member (60), the filter element (30) and the tubular wall define a substantially closed ring-shaped space.

13 Claims, 6 Drawing Sheets

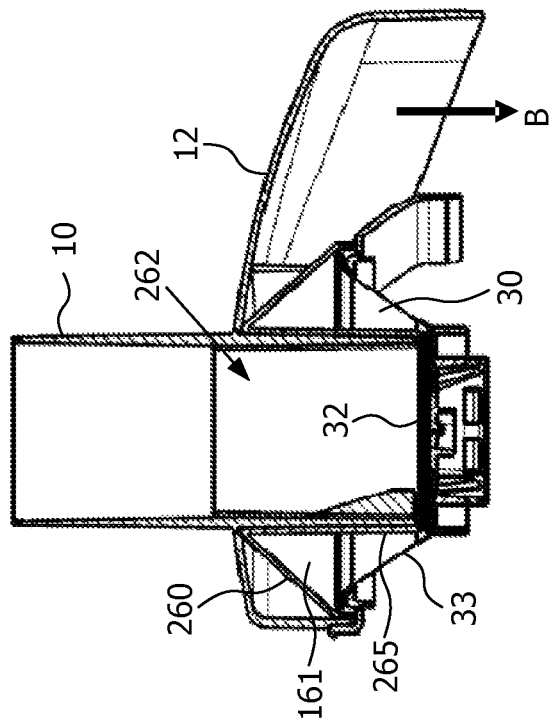
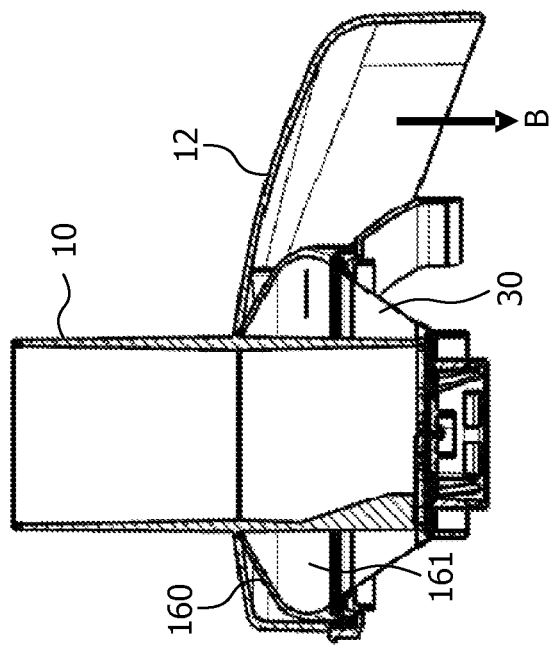

KITCHEN APPLIANCE

FIELD OF THE INVENTION

The present invention relates to a kitchen appliance. In particular the invention relates to a kitchen appliance known as a juice extractor.

BACKGROUND OF THE INVENTION

Kitchen appliances which are used to process foodstuff can be found in many kitchens of both families, restaurants etcetera. A particular type of kitchen appliance used in processing foodstuff is designed to process foodstuff such, that a pourable or liquidized foodstuff is obtained. Such kitchen appliances are for example mixers, blenders and juice extractors. Such devices are widely known and are for example used to extract the juice present in fruit or vegetables, or to blend certain foodstuffs so that people may enjoy the consumption of such foodstuff including all the good vitamins and nutritious contents of the fruit or vegetables in an easy manner. Normally the resulting pourable foodstuff, such as fruit or vegetable juice for example, will be supplied to a jug or a drinking glass.

Often such kitchen appliances are designed to process enough foodstuff to produce multiple glasses of juice in one go. This means that relatively large amounts of pulp matter that remains from the foodstuff after being processed must somehow be handled. A common solution in such cases is for example presented in U.S. Pat. No. 6,050,180, which discloses a juicer having a rotatable frusto-conical filter element and a perforated wall member. A drive motor drives the rotatable filter element which comprises a grating disc provided in the filter element. Foodstuff that is fed to the grating disc through a feeding tube is smashed and juice flows through the perforated wall member. Pulp is hurled out of the filter element via an inner surface of a lid mounted on the kitchen appliance, which lid is open towards a large pulp container.

Such type of juicer is relatively large for a number of reasons. One reason is that the filter element must have a certain size in order to avoid rapid clogging thereof. Another reason is that such juicers are normally designed for supplying juice for families, i.e. 3 to 6 persons for example. A concern of this known kitchen appliance is that when relatively small amounts of foodstuff are processed to produce relatively small amounts of juice, for example for one person, a large area of components of the kitchen appliance needs to be cleaned; in particular the lid and the pulp container. Hence, such juicers are considered unsuitable by users for producing small amounts of juice. This is considered troublesome for many users and often will result in users not using the juicer at all, depriving them of all the benefits of freshly produced juice, or will result in such users buying a smaller juicer producing juice of lesser quality or to buy a separate juicer for small amounts of juice. In other words, known juice extractors are associated with a relatively large cleaning effort in situations where only a minor amount of juice is produced.

OBJECT OF THE INVENTION

It would therefore be desirable to provide a kitchen appliance of the above-mentioned type that is considered suitable to produce small amounts of juice. More in particular it would also be desirable to provide a kitchen appliance of the above-mentioned type that is considered convenient to use by a user when producing small amounts of juice.

SUMMARY OF THE INVENTION

To better address one or more of these concerns, a kitchen appliance for processing foodstuff is provided wherein the kitchen appliance comprises a rotatable filter element having a substantially closed bottom part provided with a grating disc. Said bottom part having an outer perimeter, wherein the filter element comprises a conical perforated wall that extends from said outer perimeter to an upper edge, which upper edge defines an open upper part of the filter element. The diameter of the upper edge of the perforated wall has a larger diameter than the outer perimeter of the bottom part of the filter element. The kitchen appliance further comprises a drive motor for driving the rotatable filter element, a feeding tube having a tubular wall extending from a first open distal end for receiving foodstuff to a second open distal end, wherein said second distal end opens near said grating disc, and a cover member extending from the upper edge of the perforated wall up to the tubular wall of the feeding tube to close said open upper part of the filter element, wherein the cover member, the filter element and, at least part of, said tubular wall define a substantially closed, ring-shaped space.

The provision of a cover member that together with the filter element and, at least part of, the outer surface of the feeding tube wall encloses a substantially closed space makes it possible to limit, or localize, the area in which pulp resulting from the processing of the foodstuff is collected, while still using a kitchen appliance or juicer of the indicated type. In fact, all the pulp produced will be collected within a space enclosed by the cover member.

Hence, the kitchen appliance according to the invention is suitable for, relatively, small amounts of juice. Furthermore, when juice has been produced the only components of the kitchen appliance or juicer that need to be cleaned from pulp matter are the filter element and the cover member. This drastically reduces the cleaning effort for a user.

In an embodiment a kitchen appliance is provided that further comprises a housing having an inner space that accommodates the filter element, and a closing lid attachable to the housing, substantially closing the inner space of the housing when attached to the housing, wherein the closing lid carries the feeding tube and comprises an outlet that is open towards a pulp container that is arranged to receive pulp matter that originates from the processed foodstuff. The cover member comprises a opening through which the feeding tube extends and wherein the cover member is removably insertable in said inner space of the housing to close the upper open part of the filter element.

The cover member being removably insertable between the upper section of the filter element and the outer surface of the feeding tube wall has the effect that pulp will be collected within the substantially enclosed space. Furthermore, as said space is substantially closed, the pulp produced will not be able to reach the opening in the lid that opens towards the pulp container. Hence, after using the kitchen appliance provided with the insertable cover member a user does not have to clean the lid and the pulp container. More in particular, a common kitchen appliance or juicer is now suitable for producing a, relatively small amount of juice, while resulting in only a minor amount of dirty components.

In an embodiment the cover member is attachable to the closing lid by inserting the tubular wall of the feeding tube into the opening of the cover member. This increases the ease of use of the cover member.

In an embodiment the opening of the cover member has dimensions that matingly correspond to outer dimensions of the tubular wall of the feeding tube. This allows for removal of the closing lid while the cover member stays attached to the feeding tube.

In an embodiment the closing lid comprises an inner surface facing the filter element, wherein said inner surface is shaped to form a guide surface for guiding the pulp matter that originates from the processed foodstuff towards the outlet. This improves the removal of pulp matter when no cover member is installed.

In an embodiment the filter element defines a filter element space having first volume and the cover member defines a cover member space having a second volume, wherein the second volume is in the range of 60% to 200% of the first volume. These ranges provide optimal results.

In an embodiment the cover member has an inner surface facing the filter element, which inner surface has a concave shape. This provides a maximized volume for the pulp matter to be collected.

In an embodiment said inner surface of the cover member facing the filter element has a frusto-conical shape. This has proven to be the most optimal shape both in respect of adherence of the pulp matter to the inner surface and as to volume.

According to a further aspect of the invention a cover member is provided that is insertable in a kitchen appliance, wherein the kitchen appliance comprises a rotatable filter element having a substantially closed bottom part provided with a grating disc, said bottom part having an outer perimeter. The filter element comprises a conical perforated wall that extends from said outer perimeter to an upper edge, which upper edge defines an open upper part of the filter element The diameter of the upper edge of the perforated wall has a larger diameter than the outer perimeter of the bottom part of the filter element. The kitchen appliance further comprises a motor for driving the rotatable filter element, a feeding tube having a tubular wall extending from a first open distal end for receiving foodstuff to a second open distal end, wherein said second distal end opens near said grating disc. Further the kitchen appliance comprises a housing having an inner space that accommodates the filter element, and a closing lid attachable to the housing and substantially closing the inner space of the housing when attached to the housing, wherein the closing lid carries the feeding tube and comprises an outlet that is open towards a pulp container that is arranged to receive pulp matter that originates from the processed foodstuff. The cover member has a wall with a opening, which wall, when the cover member is inserted in the kitchen appliance, extends from the upper edge of the perforated wall of the filter element up to the tubular wall of the feeding tube to close said open upper part of the filter element, wherein the tubular wall of the feeding tube extends through said opening, such that the cover member, the filter element and, at least part of, said tubular wall define a substantially closed, ring-shaped space.

BRIEF DESCRIPTION OF THE DRAWINGS

Further advantageous embodiments of the juice extractor according to the invention are described in the claims and in the following description with reference to the drawing, in which:

FIG. 4 shows part of the kitchen appliance of FIG. 2, with a second embodiment of a cover member;

FIG. 5 shows part of the kitchen appliance of FIG. 2, with a third embodiment of a cover member;

DETAILED DESCRIPTION OF EXAMPLES

In the below description of the invention the kitchen appliance incorporating the invention will be described in the example of a juice extractor. It is emphasized here that the invention is not limited nor intended to be limited to such a juice extractor, but is equally applicable to other kitchen appliances such as blenders, mixers and the like. In other words, the invention is applicable to kitchen appliances that are arranged to process foodstuff and can supply pourable foodstuff, such a juice from fruit and/or vegetables, milk-shakes etcetera. In other words, foodstuff that has a certain amount of liquidity.

Figure 1:
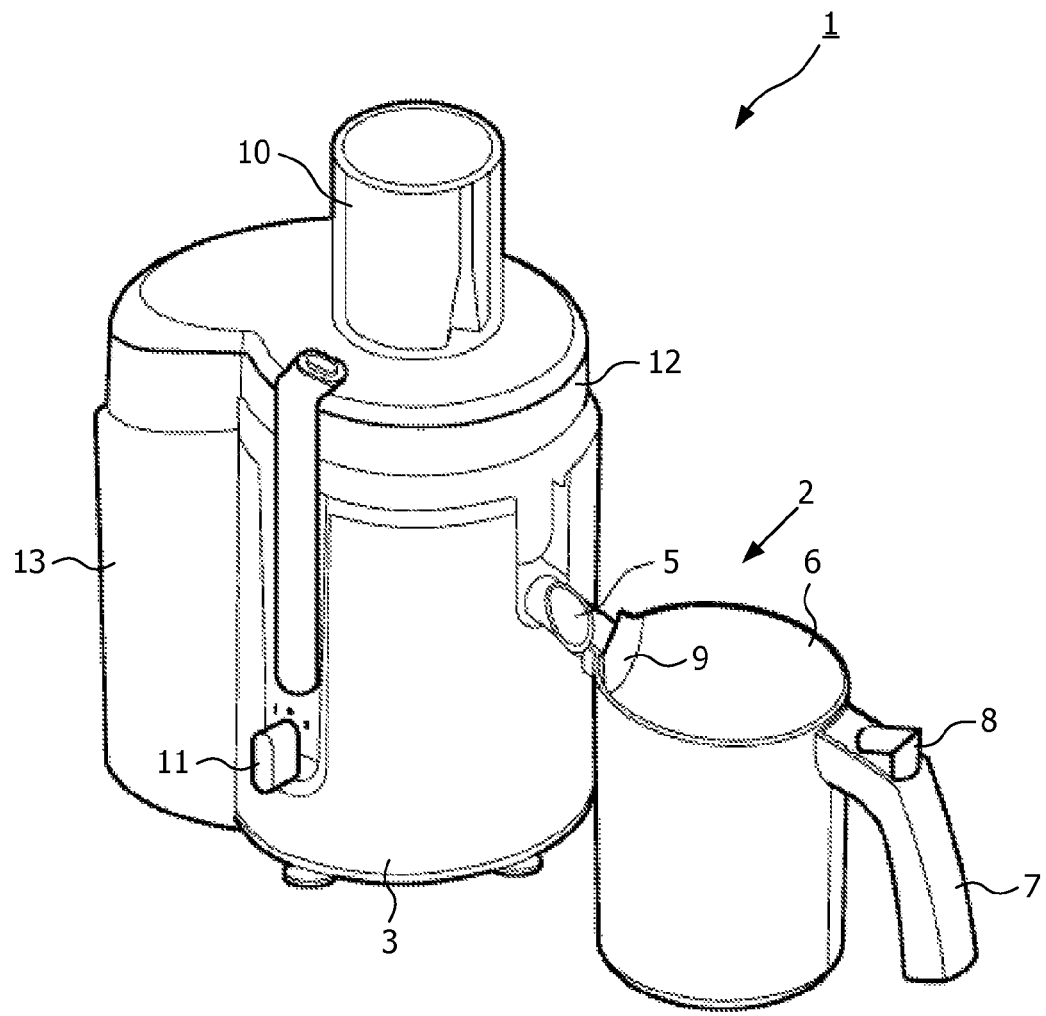
FIG. 1 shows a kitchen appliance.
Figure 2:
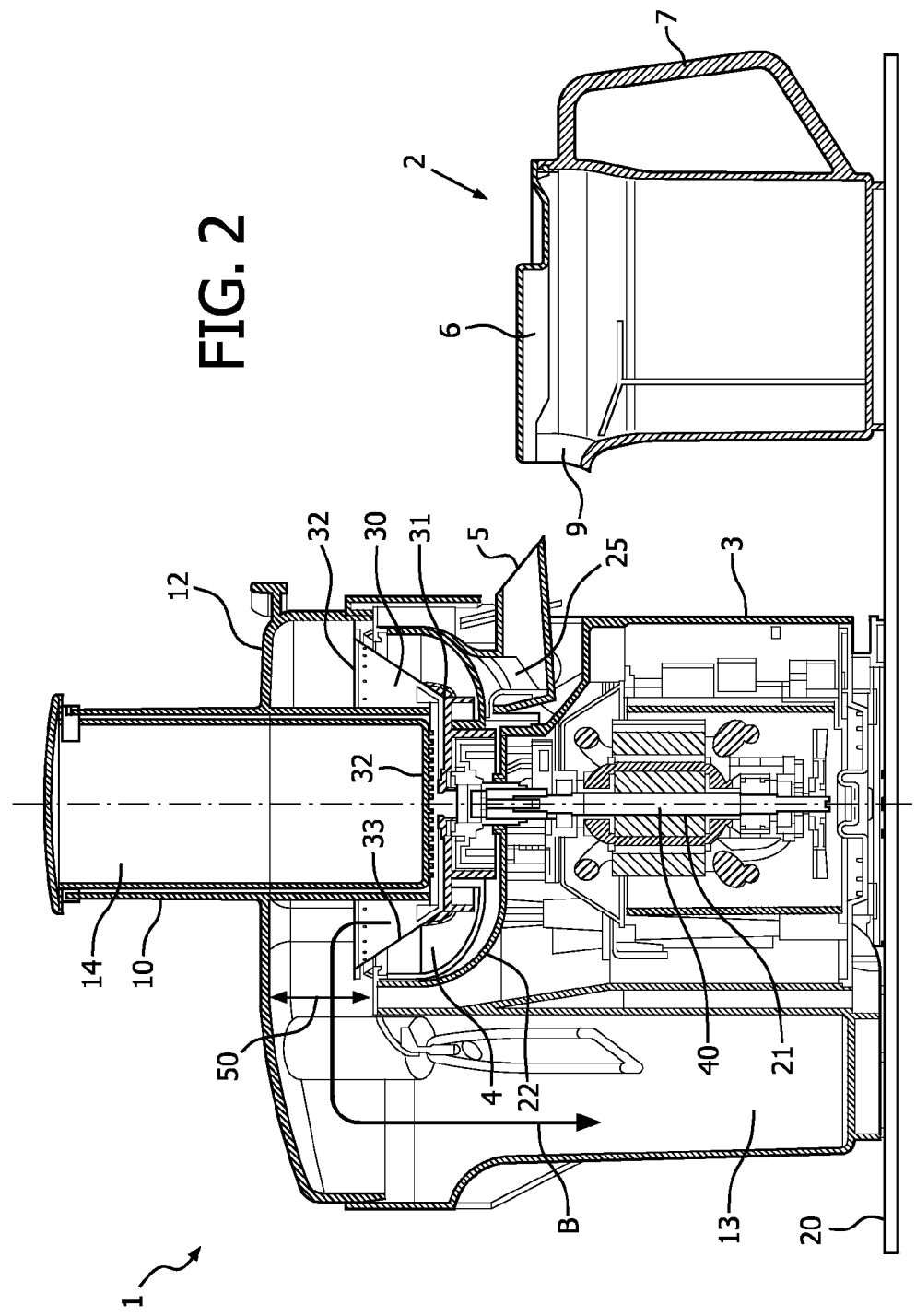
FIG. 2 shows the kitchen appliance of FIG. 1 in cross-sectional view without a cover member.

Referring to FIGS. 1 and 2 a common kitchen appliance 1 is shown, which as indicated is in the example of a juice extractor together with a jug or juice jug 2 in which juice produced by the juice extractor can be collected. The jug 2 may also be a glass.

The juice extractor 1 comprises a housing 3 which accommodates a cavity 4 (see FIG. 2) in which juice or generally pourable foodstuff can be received. The juice extractor 1 is further provided with a spout 5, which is arranged to dispense juice from the juice extractor 1 to the jug 2. The juice jug 2 is provided with a lid 6 and a handle 7. The lid may be hingeable. On the handle 7 an actuation knob 8 is provided that can be pressed by a user to open the lid 6. Further, the juice jug 2 comprises a pouring spout 9 that allows juice contained in the juice jug 2 to be poured. The juice extractor 1 has a feeding tube 10 having a push member 14 (see FIG. 2) that is used to feed fruit or vegetables to the juice extractor 1. In the example shown, the juice extractor 1 is an electric juice extractor that is driven by a drive motor 21 (see FIG. 2). Hence, a power switch 11 is provided to control the juice extractor 1. The juice extractor 1 comprises a lid 12 that supports the feeding tube 10, and comprises a pulp container 13 (see FIG. 2).

The drive motor 21 is connected to a rotatable filter element 30 by means of a drive axis 40. The filter element 30 has a substantially closed bottom part 31, an open upper part 32 and a perforated wall 33 that extends from an outer perimeter of the bottom part 31 and an upper edge of said upper section 32. At its bottom part 31 the filter element 30 is provided with a grating disc 34 for grating foodstuff that is provided through the feeding tube 10 to the filter element 30 while the push member 14 is used to push the foodstuff against the grating disc 34. As can be seen in FIG. 2, the upper edge of the upper part 32, i.e. the upper edge of the perforated wall 33, has a larger diameter than the outer perimeter of the bottom part 31. The filter element 30 is preferably conical in shape. This has the effect that the foodstuff being processed will travel in an upward direction in FIG. 2 due to the centrifugal forces that are exerted on the foodstuff. As the filter element 30 is spinning, the grated foodstuff travels along the surface of the perforated wall 33. While the grated foodstuff is on the surface of the perforated wall 33, which surface faces the tubular wall of the feeding tube 10, juice will be allowed through the perforated wall 33 and pulp matter will remain behind. As the filter element 30 is still being rotated. Common speeds at which the filter element 30 is spinning are in the range of 1000 to 20000 rpm. The pulp matter, at least a main part thereof, is transported out of a filter element space which is defined by the filter element in a direction indicated with arrow B in FIG. 2. In order for the pulp matter to be transported smoothly to the pulp container 13, the closing lid 12 has an outlet 50 (schematically depicted with a double arrow in FIG. 2) that is open towards the pulp container 13. Further, the closing lid 12 has an inner surface that is shaped to form a guide surface for guiding the pulp matter that originates from the processed or grated foodstuff towards the outlet 50.

FIG. 2 shows the juice extractor 1, i.e. the kitchen appliance, together with the juice jug 2 in a sectional view. Both the juice extractor 1 and the juice jug 2 are placed on a support surface 20, for example a table top or the working surface of a kitchen. The juice jug 2 shown in FIG. 2 has a closable lid 6 that must be removed by hand, as an alternative to the hingeable lid 6 as shown in FIG. 1. As can be seen in more detail in FIG. 2, the juice extractor 1 and in particular the cavity 4, that is formed by a collector 22 which is arranged to receive juice that has passed through the filter element. The collector 22 is provided with an outlet 25 that opens into the spout 5 which is open at an upper part thereof.

The juice extractor as shown in FIG. 1 and in FIG. 2 corresponds to a commonly used juice extractor as is for example described in U.S. Pat. No. 6,050,180 and in which it is also described how the inner surface of the closing lid 12 acts as a guide surface for the pulp matter. As mentioned such common juice extractors give rise to a relatively large cleaning effort if only a small amount of juice is required.

Figure 3:
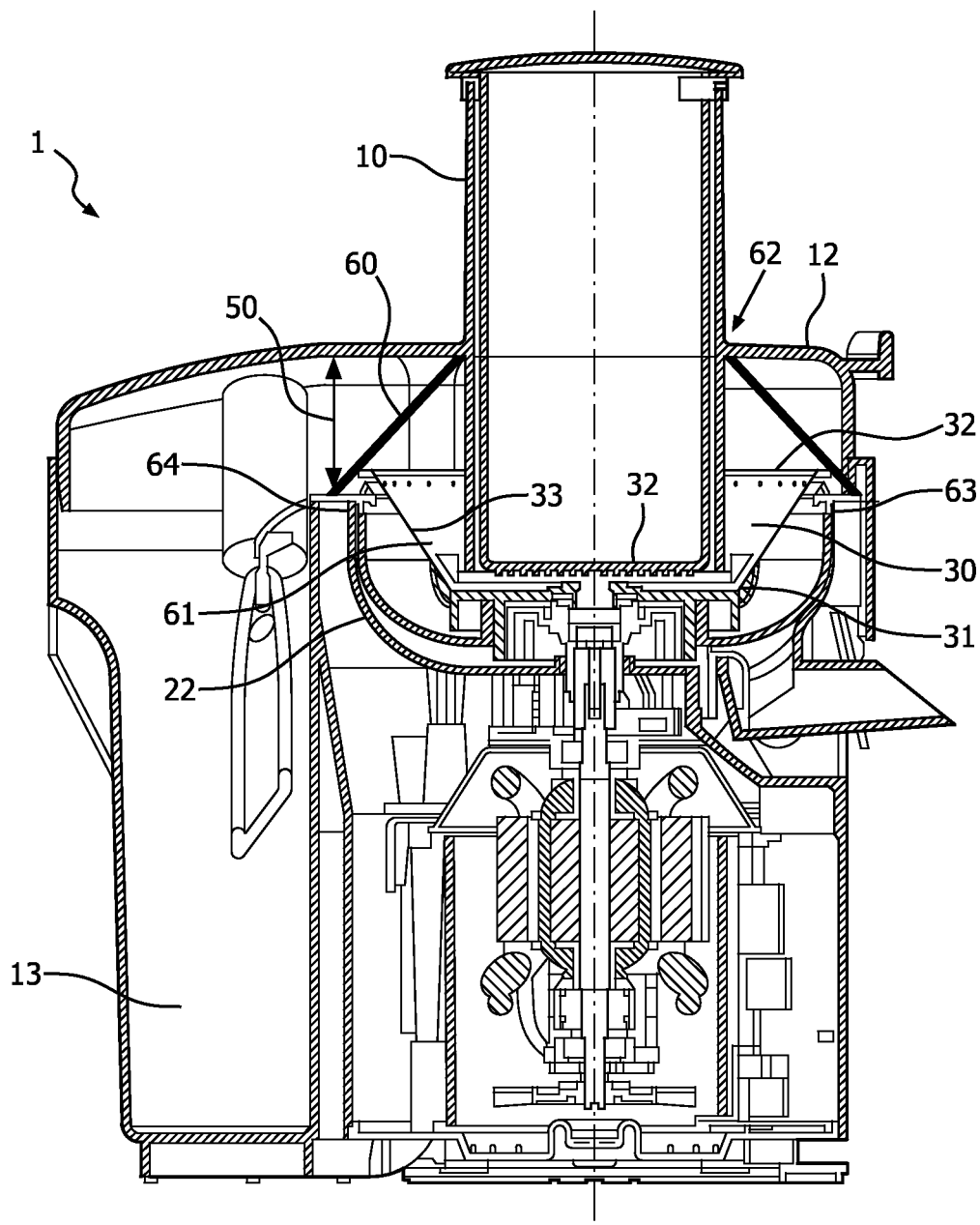
FIG. 3 shows the kitchen appliance of FIG. 2, with a first embodiment of a cover member.
Figure 6:
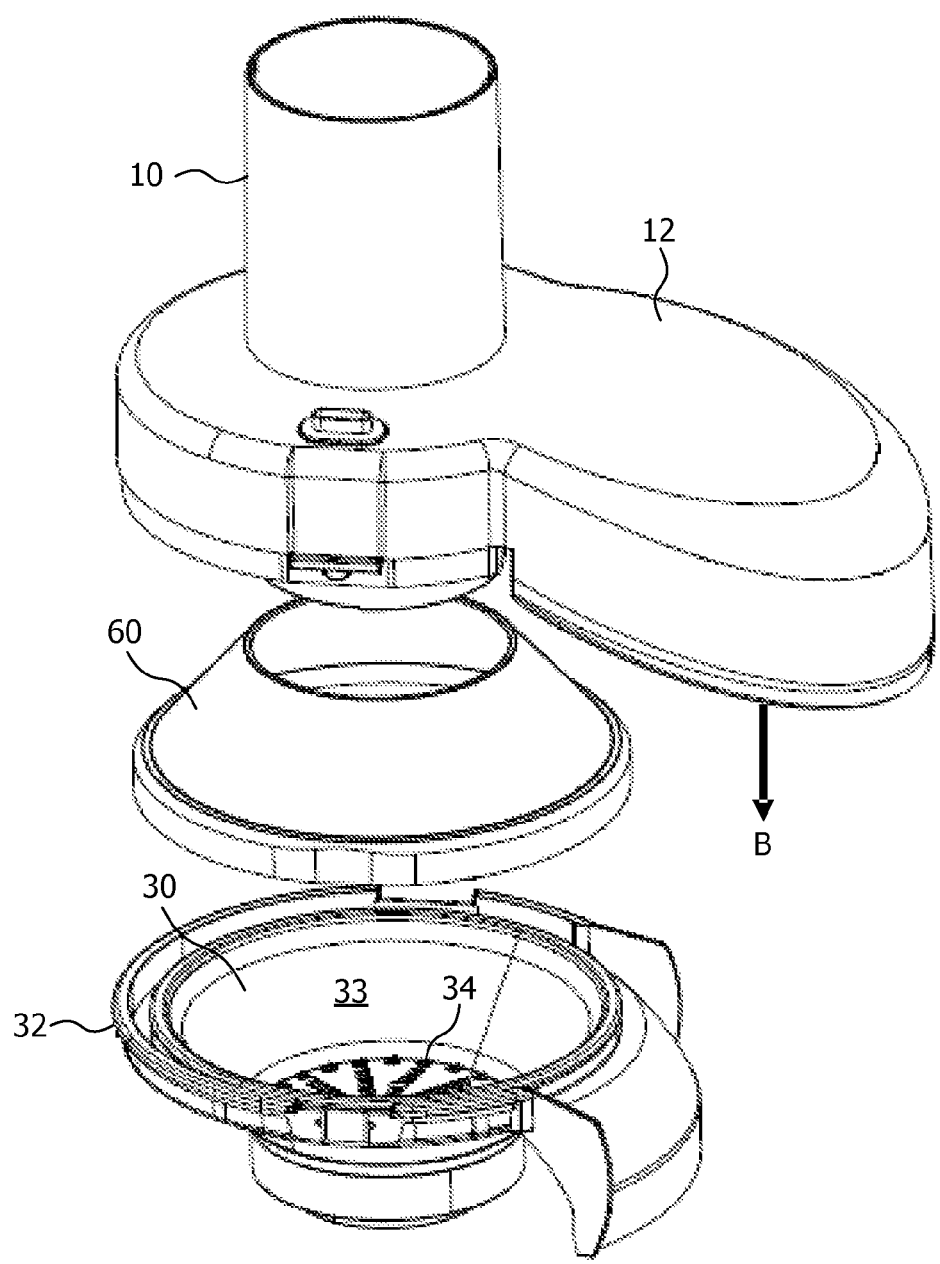
FIG. 6 is an exploded view of a filter element, a closing lid and the cover member of FIG. 3.
Figure 7:
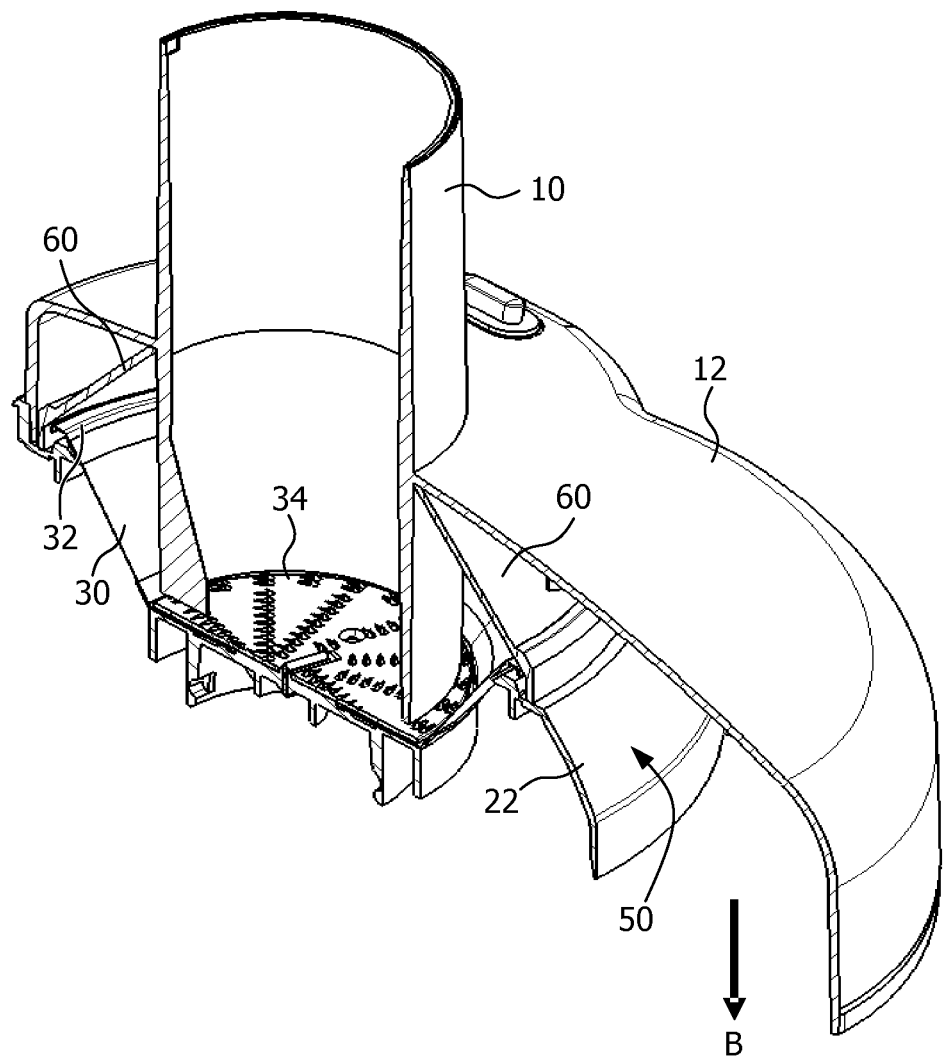
FIG. 7 shows a sectional view of a filter element, a closing lid and the cover member of FIG. 3.

According to the present invention it is proposed to limit the amount of components of the juice extractor that will come into contact with pulp matter when only a small amount, for example only one glass of juice of for example 250 ml is required. To achieve this, an insertable cover member 60 is inserted in the inner space of the housing 3. This is explained in more detail with reference to FIGS. 3 to 7. As can be seen in FIGS. 3, 6 and 7, FIG. 6 being an exploded view of FIG. 7, the cover member 60 extends from the upper edge of the perforated wall up 33 to the tubular wall of the feeding tube 10 to close said open upper part 32 of the filter element 30, wherein the cover member 60, the filter element 30 and, at least part of, said tubular wall define a substantially closed, ring-shaped space 61. It is noted here that although the wording ring-shaped is used here, it is intended not to be limited to circular cross-sections only. In fact, as can be seen in FIGS. 3, 4 and 5 the ring-shaped space 61 is arranged such that is surrounds, at least part of, the feeding tube 10. Hence, the wording ring-shaped is used. The effect of the insertion of the cover member 60 is that pulp matter will be caught inside the ring-shaped space 61 and in particular in the space defined by the cover member 60, i.e. a cover member space due to the centrifugal action of the filter element 30. This means that after the juice extractor 1 has been used only a very small area has come into contact with the pulp matter, i.e. only those components which define the ring-shaped space 61. The cover member 60 avoids the pulp matter to pass through the outlet 50 and to reach the pulp container 13. The cover member 60 comprises an opening 62, preferably a central opening, through which the feeding tube 10 with its tubular wall extends. In the example of FIG. 3 the feeding tube 10 is carried by the closing lid 12. Further it can be seen that the central opening 62 has inner dimensions that matingly correspond to the outer dimensions of the tubular wall of the feeding tube 10. Hence, the cover member 60 seals against the surface of the tubular wall of the feeding tube 10. Preferably, the cover member 60 is attached to the tubular wall of the feeding tube 10 by inserting the tubular wall into the central opening 62. After using the juice extractor 1, the user may than remove the closing lid 12 without having to handle the cover member 60 at that moment. This is advantageous, as the cover member 60 can be removed from the closing lid 12 at a location where it can be cleaned and/or where spoiling of pulp matter is no issue. However, it is also conceivable to attach the cover member 60 to the collector 22.

In the example of FIGS. 3, 6 and 7 the cover member 60 has an inner surface that faces the filter element 30, which inner surface has a conical shape. In FIG. 3 the inner surface has a frusto-conical shape. However, this shape may also be generally concave.

Other shapes of the inner surface of the cover member 60 are also possible and are for example shown with reference to FIGS. 4 and 5.

In order to be able to store sufficient pulp matter so a user may obtain at least one glass of juice from the juice extractor, the ring-shaped space 61 has a volume in the range of 100 ml to 500 ml, preferably in the range of 200 ml to 300 ml. The total volume of the ring-shaped space 61 is the sum of a first volume of the filter element space as defined by the filter element 30 and a second volume of the cover member space defined by the cover member 60. The second volume is in the range of 60% to 100% of the first volume.

In the example of FIG. 3 the cover member 60 has a lower peripheral edge 63 which seals against an outer peripheral edge 64 of the collector 22, so as to enclose a further substantially closed, ring-shaped space. Furthermore, the lower peripheral edge 63 of the cover member 60 has a diameter that substantially corresponds to the diameter of the upper edge of the perforated wall 33 of the filter element 30. For reasons of convenience the cover member 60 is made from a transparent material, such as transparent plastic. Preferably, the inner surface of the cover member 60 is smooth, but it may also be rough so as to make the pulp matter adhere better to the inner surface of the cover member 60.

With reference to FIGS. 4 and 5 two alternative shapes of the cover member 60 are shown. Both cover members have an inner surface that has a generally concave or a conical shape. This is preferred in order to maximize the volume wherein pulp matter can be collected. The cover member 160 of FIG. 4 has a rounded shape which provides the ring shaped space 161 with a torus-like shape or cross section and provides a larger volume for collecting pulp matter than the cover member 60 as shown in FIG. 3.

The cover member 260 as shown in FIG. 5 resembles the cover member 60 as shown in FIG. 3 and is generally conical. The difference is however that the cover member 260 further comprises a tubular part 265 that extends from the central opening 262 and closely surrounds the feeding tube 10. The provision of the tubular part 265 increases the structural strength of the cover member 260. Furthermore, as the tubular part 265 surrounds the tubular wall of the feeding tube 10, it is avoided that the tubular wall of the feeding tube 10 is soiled with pulp matter. Hence, only the cover member needs to be cleaned and the closing lid 12, i.e. the feeding tube 10, will remain clean. The tubular part 265 ends close to the grating disc 32 and leaves open an annular passage for the grated or macerated foodstuff to pass through so the foodstuff can reach the perforated wall 33 of the filter element 30.

Further it can be seen in FIGS. 4 and 5 that the closing lid 12 is of an alternative design and comprises a more articulated inner surface to guide pulp matter (direction B) towards the pulp container (not shown) in case the respective cover members are not inserted in the inner space of the housing 3 (not shown). It is noted that the tubular part 265 may of course be combined with any shape of the cover member.

The invention has been described in relation to a juice extractor. It is to be understood however that the invention is not limited to the examples given, but that these examples are only given to exemplify certain embodiments of the invention. In particular it is noted that the invention has been described in the example of a juice extractor. It is emphasized again that the invention is not limited nor intended to be limited to such a juice extractor, but is equally applicable to other kitchen appliances such as blenders, mixers and the like and even to coffee making machines and general purpose water dispensers for example. In other words, the invention is applicable to kitchen appliances that are arranged to process foodstuff and can supply pourable foodstuff, such a juice from fruit and/or vegetables, milkshakes etcetera. In other words, foodstuff that has a certain amount of liquidity.

Furthermore, it is noted here that the invention is also applicable in juice extractors which have a differently designed filter element. An example of such a different filter element is for example a filter element that does not have a conical perforated wall, but rather a cylindrical perforated wall. Another example is a filter element that has a perforated wall that does not open in an upward direction as seen from the grating disc, but rather opens in a downward direction. Also in these configurations the cover member according to the invention can be successfully applied to limit the cleaning effort to be made by a user when only limited amounts of juice are produced with the juice extractor having the differently designed filter element.

While the subject-matter has been illustrated in the drawings and the foregoing description, such illustration and description are to be considered illustrative or exemplary and not restrictive; the subject-matter is not limited to the disclosed embodiments. Other variations to the disclosed embodiments can be understood and effected by those skilled in the art of practicing the claimed subject-matter, from a study of the drawings, the disclosure and the appended claims. Use of the verb "comprise" and its conjugations does not exclude the presence of other elements other than those stated in a claim or in the description. Use of the indefinite article "a" or "an" preceding an element or step does not exclude the presence of a plurality of such elements or steps. The Figures and description are to be regarded as illustrative only and do not limit the subject-matter. Any reference sign in the claims should not be construed as limiting the scope.

The invention claimed is:

1. An appliance for processing a foodstuff to produce pulp and a pourable extract, said appliance comprising:
    a housing supporting a filter for rotation about an axis, said filter including:
        a bottom part provided with a grating disc and having an outer first perimeter; and
        a perforated wall for passing the pourable extract, said perforated wall extending from the outer first perimeter to an upper edge defining an open end of the filter having an outer second perimeter that is larger than the outer first perimeter;
    a drive motor coupled to the filter for effecting rotation of the filter with the grating disc about the axis;
    a feeding tube having a tubular wall extending from a first end thereof for receiving the foodstuff to a second end thereof cooperatively coupled to the grating disc for producing the pulp, at least a part of said tubular wall having an outer perimeter that is smaller than the outer second perimeter of the filter;
    a container in the housing having a predetermined volume configured for collecting and retaining the pulp produced during operation; and
    a removable cover member configured for enabling selection of either a first smaller volume of the appliance or a second larger volume of the appliance configured for collecting and retaining the pulp produced during operation,
        said removable cover member, when installed in the appliance, extending from the upper edge of the perforated wall to the outer perimeter of the tubular wall part, where the removable cover member, the filter, and at least part of said tubular wall define a closed annular space having the first smaller volume configured for collecting and retaining the pulp produced during operation while blocking flow of the pulp to the container in the housing; and
        said removable cover member, when removed from the appliance, configured for enabling the pulp produced during operation to flow to the container in the housing, said container having the second larger volume.

2. The appliance according to claim 1 where the housing comprises a closing lid supporting the feeding tube and including an outlet coupled to the container having the second larger volume, said outlet being blocked by the removable cover member when said removable cover member is installed in the housing and being open to pass the pulp produced during operation when said removable cover member is removed from the housing.

3. The appliance according to claim 2 where the removable cover member includes a central opening and is attachable to the closing lid by inserting the tubular wall of the feeding tube into the central opening in the removable cover member.

4. The appliance according to claim 3 where the central opening of the removable cover member has dimensions that matingly correspond to outer dimensions of the tubular wall of the feeding tube.

5. The appliance according to claim 2 where the closing lid comprises an inner surface facing the filter, said inner surface being shaped to form a guide surface for guiding the pulp toward the outlet.

6. The appliance according to claim 1 where the closed annular space comprises a combination of a lower space defined by the filter and an upper space defined by the removable cover member, said upper space having a volume in a range of 60% to 100% of a volume of the lower space.

7. The appliance according to claim 1 where the annular space has a volume in a range of 100 ml to 500 ml.

8. The appliance according to claim 1 where the removable cover member has an inner surface facing the filter, said inner surface having a concave shape.

9. The appliance according to claim 1 comprising a collector at least partially surrounding the filter, said collector being arranged to receive pourable foodstuff that has passed through the perforated wall of the filter.

10. The appliance according to claim 9 where the removable cover member and the collector form a closed space.

11. The appliance according to claim 9 where the removable cover member has a lower peripheral edge that seals against an outer peripheral edge of the collector.

12. The appliance according to claim 1 where the closed annular space has a volume in a range of 200 ml to 300 ml.

13. The appliance according to claim 1 where the removable cover member has an inner surface facing the filter, said inner surface having a frusto-conical shape.

\* \* \* \* \*